June 28, 1938.     A. W. LISSAUER     2,122,037
UTILIZATION OF WASTE GASES
Filed July 27, 1936
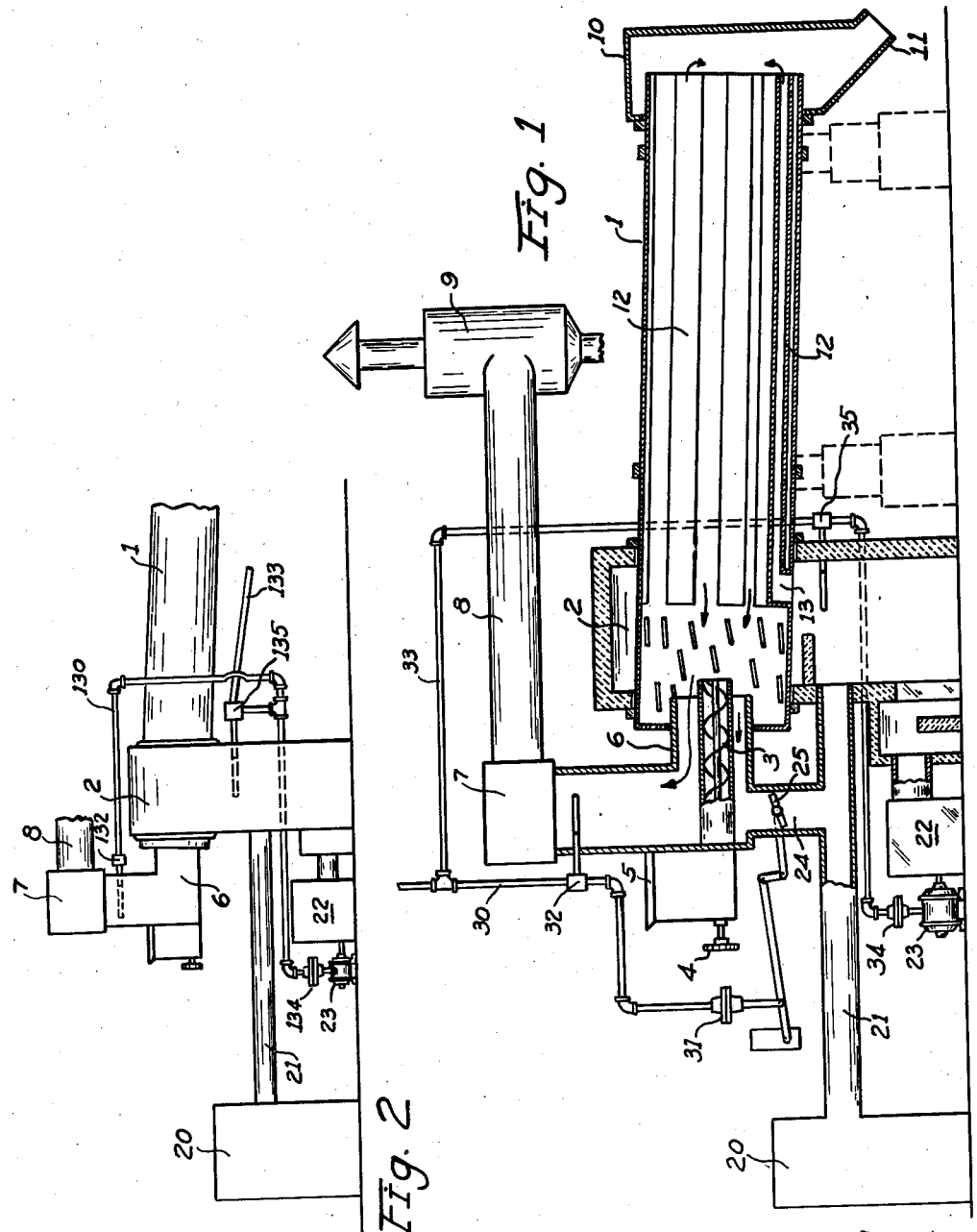
Inventor
A.W. Lissauer
By W.E. Sherwood
Attorney

UNITED STATES PATENT OFFICE 2,122,037

UTILIZATION OF WASTE GASES

Adolph W. Lissauer, Louisville, Ky., assignor to Louisville Drying Machinery Company, Incorporated, Louisville, Ky., a corporation of Kentucky Application July 27, 1936, Serial No. 92,832

4 Claims. (Cl. 34—24)

This invention relates generally to the utilization of hot waste gases in the drying of various materials. Although the teaching of the same may be followed regardless of the origin of the gases, as an illustration the invention is disclosed in connection with the operation of the conventional distillery. It is to be expressly understood, however, that the invention is limited in no way to this particular application, but on the contrary may be used in connection with gases derived from any source.

In the usual practice, large volumes of waste gas from a distillery boiler plant are rejected at a temperature of about 500–600° F. If the combustion process is efficient and a maximum use is made of the gas in boilers, stills and the like, the temperature of the same has been found to be insufficient for any adequate drying purpose despite the fact that it still contains valuable heat. Although it is customary to use such gases for economizers, feed water preheaters and the like, no serious attempt has ever been made to utilize the large quantities of heat in such gases for purposes of drying materials which require drying gases of high temperature. At the same time that these valuable gases are wasted, it is the practice to generate all of the drying gases of high temperature from another source in order to dry the grain elements recovered from the distillery slop. Due primarily to the fact that efficient hot air driers require a drying medium at approximately 1100° F. no commercially successful use of cooler waste gases in such driers, therefore, has even been made, so far as is known.

It has now been found that if a relatively small volume of gas at a temperature greatly in excess of that required for drying is mixed with the waste gases, the temperature of the mixed gases can be raised to a point where the waste gas may be used for efficient drying. This is due primarily to the fact that the waste gas being at 500° F. or higher possesses an original increment of heat which materially lessens the heat transfer load required to bring the drying medium up to the 1100° F. drying temperature. While all values of temperature given herein are merely illustrative and are not to be considered as limiting the scope of the invention, it is found that a small and efficient auxiliary combustion means can readily generate sufficient gas at 2600° F. which when mixed in relatively small quantities with the larger volumes of the waste gas at 500–600° F. will give an ample quantity of drying medium at 1100° F.

By employing an efficient combustion process for the auxiliary gas and a suitable control of the drying process, an increased evaporation effect per pound of fuel burned in the entire plant thus results. At the same time the costs of plant installation are materially lowered since the combustion means for the relatively small amount of auxiliary gas is much less expensive than the means heretofore used when all of the drying medium was separately generated.

The invention, therefore, has as a chief object the teaching of a method for utilizing the heat of waste gases.

A second object is the provision of an improved drying process which is less expensive to operate and which requires a minimum of equipment.

A third object is the provision of a drying process readily controlled in dependence upon critical temperatures of the drying medium.

Another object is the provision of an improved control apparatus for driers.

Another object is the teaching of a method for incorporating the drying of by-products of an industrial plant into the normal operation of such plant.

Other objects and advantages of the invention will become more apparent as the description proceeds when considered in connection with the accompanying drawing in which—

Figure 1 is a view partially in section showing one form of apparatus which may be used to carry out the invention and Figure 2 is a schematic view showing one modification of the control means wherein all of the waste gases pass through the drying apparatus.

As will be apparent to those skilled in the art, many modifications in the forms of drying apparatus, control means and heat generating equipment may be employed without departing from the essentials of the invention and, therefore, the invention is not to be considered as limited to the exact arrangement and apparatus shown herein.

Referring now to Figure 1, a rotary drier 1 of any suitable construction, which for example may be of the type disclosed in United States Letters Patent, 1,853,691 to A. W. Lissauer et al., is mounted upon any suitable supporting means and rotated by a suitable actuating means. At one end the drier extends through a chamber 2 filled with a heating medium derived from sources disclosed hereinafter and having a sufficient temperature and volume to insure an efficient drying of the wet material introduced into said drier by a conveyor 3. This conveyor is driven from a suitable regulated source of power by member 4 and moves into the drier the material introduced into hopper 5 along with such air as may enter with the material into the hopper.

Extending into the closed inlet end of the drier is an exhaust conduit 6 for the purpose of receiving the exhaust gases and the moisture resulting from the drying process. This exhaust conduit leads through a casing 7 in which is housed a suitable exhaust fan (not shown) and connects with a second conduit 8 leading into a cyclone separator or other suitable apparatus 9 from which the exhaust gases and moisture may escape and in which any small particles of dried material entrained by such gases may be recovered.

At its outlet end drier 1 is provided with a suitable casing or manifold 10 having a lower restricted spout member 11 from which dried material falling from the open end of the drier interior may be taken. On its interior drier 1 may be provided with suitable conduits 12 having openings 13 communicating with chamber 2 and terminating in an open end within the casing 10. The heating medium thus exerts a drying effect upon the material in the drier by radiation from and by conduction of heat through conduits 12. Upon leaving conduits 12 the heating medium passes countercurrent to the movement of material and is able to continue its drying effect by direct contact with such material.

At 20 is indicated generally the exhaust stack of an industrial boiler plant from which all of the waste gases may be led through a conduit 21 into chamber 2 when the drying process is to be carried out. These waste gases will usually have a temperature ranging from 500–600° F. which is insufficient to dry the material both thoroughly and efficiently. In order, therefore, to increase the temperature of the heating medium entering the drier, an auxiliary combustion means 22 of any suitable nature, such for example as a furnace equipped with a stoker driven by a suitable electric motor 23, may be employed.

As an aid to the regulation of temperature and volume of the heating medium incident to the drying at different loads, a by pass 24 controlled by a regulating means 25 is interposed between conduits 6 and 21.

For purposes of regulating the drying process any suitable means may be employed to vary the temperature of the heating medium entering the drier 1 and/or the temperature of the exhaust medium leaving the drier. One such means is shown in Figure 1 wherein a compressed air line 30 leads to a diaphragm actuated means 31 connected to regulating means 25 and controlled by a conventional thermostat 32 in dependence upon the temperature of the exhaust medium in exhaust conduit 6.

A second compressed air line 33 leads to a second diaphragm actuated means 34 connected to the controls of motor 23 and arranged to change the speed of such motor and to vary the feed of the stoker driven thereby, whereby the generation of auxiliary gases by furnace 22 may be regulated.

A conventional thermostat 35 located within chamber 2 adjacent the point where the hot mixed gases enter the drier conduits 12 controls the action of diaphragm means 34 in dependence upon the temperature of the heating medium entering the drier.

By means of the arrangement thus described the following method of utilizing the waste gases and controlling the drying process results. Instead of conducting the drying process as a separate adjunct to the operation of the main plant the same now becomes a unitary part of the plant operation. Gases generated in the main plant after having served their initial function are directed wholly through conduit 21 into chamber 2 with a temperature of 500–600° F. In the usual case when drying a product such as grains recovered from distillery slop, the temperature of the drying medium entering the drier should be approximately 1100° F. to insure adequate drying of the grain and the temperature of the exhaust medium leaving the drier should be approximately 250° F. when the grain is adequately dried. Assuming that thermostats 32 and 35 are so calibrated, the initial waste gases are too low in temperature to dry the material. Thermostat 35 then permits diaphragm 34 to operate to increase the generation of auxiliary gases at a temperature about 2600° F. from furnace 22 in order to bring the mixed heating medium up to 1100° F.

At the same time, if the gas entering the drier is not of sufficient temperature to dry the material, the temperature of the exhaust medium leaving the drier tends to fall below 250° F. indicating that the material is not dried sufficiently and thermostat 32 acts through diaphragm 31 to open by pass control means 25 and reduce the proportion of low temperature waste gases passing through the drier. The passage of all gases through the drier and through the by pass 24, moreover, is facilitated by exhaust fan 7 which aids in a close regulation of the drying process and provides a draft back upon the main stack 21.

If the temperature of the heating medium in chamber 2 exceeds 1100° F., indicating a danger of burning the material, thermostat 35 becomes effective to diminish the generation of the auxiliary gases. Furthermore, if the temperature of the exhaust gas exceeds 250° F., indicating that the material is being dried too much, thermostat 32 becomes effective to operate diaphragm 31 and to close the by pass control means, thus increasing the proportion of the low temperature waste gas and thus lowering the temperature of the mixed heating medium. Since the temperatures of the exhaust gas from the drier is dependent upon the temperature of the heating medium entering the drier and upon the factors of gas volume, nature of material to be dried and quantity of material to be dried, it follows that a proper design of the drier and a proper calibration of the control means described will result in an efficient and satisfactory drying operation.

Various modifications of controlling the drying operation while utilizing the waste gases of the boiler stack 20 will suggest themselves to one skilled in the art without constituting a departure from the invention. One such modification is shown in Figure 2 wherein by pass 24 is omitted and all of the waste gas enters the chamber 2 at all times. In this arrangement thermostat 135 located in chamber 2 is calibrated to close at 1100° F. and becomes effective to increase the speed of motor 23 through diaphragm means 134 only when the temperature of the mixed heating medium falls below 1100° F. This may be done by constructing the conventional thermostat control so that compressed air pressure from pipe 133 increases the pressure on diaphragm means 134 when the temperature of the gas in chamber 2 is below 1100° F.

On the other hand, thermostat 132 in the exhaust outlet 6 may be calibrated to close at 250° F. and to become effective to release the compressed air pressure upon diaphragm means 134 through the pipe connections 130 and to decrease the speed of motor 23 when the exhaust temperature increases above 250° F., which condition indicates that the 1100° F. heating medium is too hot for the load of material then being dried.

Having thus described the invention, it will be apparent that many variations in design and construction of the same may be employed without departing from the essentials thereof. With the intention, therefore, of including such changes in the above disclosure of the invention, I claim—

1. The method of utilizing waste gases of originally insufficient temperature for drying a material comprising, generating auxiliary gases of more than sufficient temperature to dry the material, mixing the waste gases with the auxiliary gases to bring the temperature of the mixture up to the requisite temperature for drying, drying the material by contact with the mixed gases moving in a single pass through the drying process, controlling the relative proportions of waste and auxiliary gases in dependence upon both the temperature of mixed gases prior to drying the material and the temperature of the exhaust gases after drying the material and continuously exhausting the entire volume of mixed gases from the drying process in order to avoid a high back pressure upon the source of waste gases.

2. Means for utilizing the waste gas of an industrial plant for drying material comprising, a drier assembly including a drier having a continuously open path for the exhaust of the drying gas, means directing the entire output of waste gas into the assembly, a by-pass in the assembly adapted to divert a part of the waste gas from passage through said drier, regulating means in the by-pass actuated in dependence upon the temperature of gases at the exhaust of the drier and adapted to control the volume of waste gas diverted through the by-pass, means supplying auxiliary drying gas of higher temperature than the waste gas to said drier for mixing with undiverted waste gas for joint passage through said drier, control means for the supply of said auxiliary gas actuated in dependence upon the temperature of the mixed gases entering the drier, means supplying material to the drier and means directing the mixed gases to exhaust through the drier in a single pass in contact with the material in order to dry the material and to prevent a high back-pressure upon the waste gas outlet from the plant.

3. Means for utilizing the waste gas of an industrial plant for drying material comprising, a drier assembly including a drier having a continuously open path for the exhaust of the drying gas, means directing the entire output of waste gas into the assembly, a by-pass in the assembly adapted to divert a part of the waste gas from passage through the drier, regulating means in said by-pass actuated in dependence upon the temperature of gases at the exhaust of the drier and adapted to regulate the volume of waste gas entering the drier from the drier assembly, means supplying auxiliary gas of higher temperature than said waste gas to said drier for mixing with the undiverted waste gas for joint passage through said drier, means supplying material to the drier and means directing the mixed gases to exhaust through said drier in a single pass in contact with the material in order to dry the material and to prevent a high back-pressure upon the waste gas outlet from the plant.

4. Means for utilizing the waste gas of an industrial plant for drying a wet material comprising, a drier assembly including a drier having a continuously open path to exhaust, means exhausting the entire output of waste gas into the assembly, means supplying auxiliary gas of higher temperature to said drier, means controlling the relative proportion of waste and auxiliary gas entering the drier in dependence upon the temperature of the gases exhausted from the drier, means controlling the relative proportion of waste and auxiliary gas passing through the drier in dependence upon the temperature of the mixed gases entering the drier, means supplying wet material to said drier and means directing the mixed gases to exhaust through the drier in a single pass in contact with the material in order to dry the material and to prevent a high back pressure upon the waste gas outlet from the plant.

ADOLPH W. LISSAUER.